United States Patent
Liu et al.

(10) Patent No.: US 10,931,344 B2
(45) Date of Patent: Feb. 23, 2021

(54) METHODS AND DEVICES FOR INFORMATION RECEPTION DURING INTRA-FREQUENCY MEASUREMENT GAP

(71) Applicant: Telefonaktiebolaget LM Ericsson (publ), Stockholm (SE)

(72) Inventors: Jinhua Liu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 15/774,277

(22) PCT Filed: Dec. 22, 2017

(86) PCT No.: PCT/CN2017/117979
§ 371 (c)(1),
(2) Date: May 7, 2018

(87) PCT Pub. No.: WO2018/149227
PCT Pub. Date: Aug. 23, 2018

(65) Prior Publication Data
US 2019/0115962 A1  Apr. 18, 2019

(30) Foreign Application Priority Data
Feb. 20, 2017 (WO) ................ PCT/CN2017/074146

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0456* (2013.01); *H04B 7/06* (2013.01);
(Continued)

(58) Field of Classification Search
CPC .... H04W 24/10; H04W 24/08; H04B 7/0617; H04B 7/0848; H04B 7/06; H04B 7/0691;
(Continued)

(56) References Cited

U.S. PATENT DOCUMENTS

2013/0102243 A1   4/2013 Gunnarsson et al.
2013/0237218 A1*  9/2013 Li ....................... H04W 48/16
                                                        455/434
(Continued)

FOREIGN PATENT DOCUMENTS

CN       101466106 A    6/2009
WO       2016/018121 A1 2/2016
(Continued)

OTHER PUBLICATIONS

International Preliminary Report on Patentability, PCT App. No. PCT/CN2017/117979, dated May 29, 2019, 27 pages.
(Continued)

*Primary Examiner* — Mandish K Randhawa
(74) *Attorney, Agent, or Firm* — Nicholson De Vos Webster & Elliott LLP

(57) ABSTRACT

Embodiments of the present disclosure relate to methods and devices for information reception during an intra-frequency measurement gap. In example embodiments, the terminal device is served by at least one network device and includes a receiver equipped with a plurality of RX RF chains. The terminal device selects two sets of RX RF chains from the plurality of RX RF chains and uses these two sets of RX RF chains respectively for an intra-frequency measurement and information reception during an intra-frequency measurement gap. In this way, efficiencies of communications/services may be improved, and further user experiences may be improved.

23 Claims, 6 Drawing Sheets

(51) Int. Cl.
*H04B 7/0456* (2017.01)
*H04W 24/10* (2009.01)
*H04W 24/08* (2009.01)

(52) U.S. Cl.
CPC ......... *H04B 7/0626* (2013.01); *H04B 7/0691* (2013.01); *H04B 7/08* (2013.01); *H04B 7/0848* (2013.01); *H04W 24/10* (2013.01); *H04W 24/08* (2013.01)

(58) Field of Classification Search
CPC .... H04B 7/0874; H04B 7/088; H04B 7/0626; H04B 7/08; H04B 7/0456
See application file for complete search history.

(56) References Cited

U.S. PATENT DOCUMENTS

2013/0322376 A1* 12/2013 Marinier ............... H04L 5/0057
370/329

2015/0327103 A1 11/2015 Tang et al.
2016/0183234 A1 6/2016 Sung et al.
2016/0337916 A1 11/2016 Deenoo et al.

FOREIGN PATENT DOCUMENTS

WO 2016/164782 A1 10/2016
WO 2018/071132 A1 4/2018

OTHER PUBLICATIONS

Supplementary Partial European Search Report and Search Opinion, EP App. No. 17896979.6, dated Dec. 13, 2019, 16 pages.
International Search Report and Written Opinion for Application No. PCT/CN2017/117979, dated Mar. 27, 2018, 9 pages.
Supplementary European Search Report and Search Opinion, EP App. No. 17896979.6, dated Mar. 12, 2020, 19 pages.

* cited by examiner

US 10,931,344 B2

METHODS AND DEVICES FOR INFORMATION RECEPTION DURING INTRA-FREQUENCY MEASUREMENT GAP

CROSS-REFERENCE TO RELATED APPLICATIONS

This application is a National Stage of International Application No. PCT/CN2017/117979, filed Dec. 22, 2017, which claims priority to International Application No. PCT/CN2017/074146, filed Feb. 20, 2017, which are hereby incorporated by reference.

TECHNICAL FIELD

Embodiments of the present disclosure generally relate to the field of telecommunications, and in particular, to methods and devices for information reception during an intra-frequency measurement gap.

BACKGROUND

With a wide use of a transmitter/receiver equipped with an antenna array, a beamforming technology has a great development. At present, the following two types of beamforming are often used: digital beamforming and analog beamforming. In the digital beamforming, a precoding matrix may be applied in a digital domain. By applying different precoding matrices for different user equipments (UEs), different beams may be generated for different UEs using a set of antenna elements within one antenna port.

In the analog beamforming, a precoding matrix may be applied by using analog phase shifters in an analog domain. One antenna port may be only used to generate one main beam. It is impractical to use the set of antenna elements within the antenna1 port to generate a plurality of main beams for multiple UEs simultaneously since these UEs are usually in different directions. In this situation, it has been proposed to arrange more than one transmitting (TX) Radio Frequency (RF) chain in a transmitter, or more than one receiving (RX) RF chain in a receiver. Each of the RF chain is connected to a set of antenna elements. Such an antenna arrangement may be referred to as a hybrid beamforming antenna.

In addition, in order to enable mobility of the UE, an inter-frequency measurement and an intra-frequency measurement have been proposed. In general, during these measurements, the UE has to stop all ongoing activities in current operating beams or carriers, and switch to other beams or carriers for the measurements. As a result, ongoing services are interrupted for the UE. Such an interruption of the services will degrade user experiences. Especially for a UE having a receiver equipped with the hybrid beamforming antenna, the disability of accessing the services during the measurement gap may significantly degrade efficiencies of UE's communications.

SUMMARY

In general, example embodiments of the present disclosure provide methods and devices for information reception during an intra-frequency measurement gap.

In a first aspect, a method implemented at a terminal device is provided. The terminal device is served by at least one network device and includes a receiver equipped with a plurality of RX RF chains. According to the method, the terminal device selects a first set of RX RF chains and a second set of RX RF chains from the plurality of RX RF chains. Then, during an intra-frequency measurement gap, the terminal device uses the first set of RX RF chains to perform an intra-frequency measurement for a candidate beam and uses the second set of RX RF chains to receive information in at least one serving beam from the at least one network device. The candidate beam has a beam lobe shape different from at least one direction or beam width of the at least one serving beam.

In some embodiments, the terminal device may determine a selection rule for the first set of RX RF chains. Then, the terminal device may select the first set of RX RF chains from the plurality of RX RF chains based on the selection rule.

In some embodiments, the terminal device may receive a configuration of the selection rule from the at least one network device.

In some embodiments, the terminal device may receive a Radio Resource Control (RRC) signaling from the at least one network device and then obtain the configuration of the selection rule from the received RRC signaling.

In some embodiments, the selection rule may be related to at least one of: qualities of signals received using the plurality of RX RF chains, and indexes associated with the plurality of RX RF chains.

In some embodiments, the at least one network device may include a plurality of network devices, and the plurality of RX RF chains may be associated with a plurality of connections from the plurality of network devices. In these embodiments, the terminal device may select at least one connection from the plurality of connections. Then, the terminal device may determine, from the plurality of RX RF chains, RX RF chains associated with the at least one selected connection and select the first set of RX RF chains from the determined RX RF chains.

In some embodiments, the terminal device may receive a triggering indication for the intra-frequency measurement from one of the plurality of network devices. Upon the reception of the triggering indication from the network device, the terminal device may select, from the plurality of connections, a connection associated with the network device.

In some embodiments, the terminal device may select a secondary connection from the plurality of connections.

In some embodiments, the terminal device may receive configurations of the intra-frequency measurement gap from the at least one network device.

In some embodiments, the terminal device may receive an RRC signaling, or system information from the at least one network device. Then, the terminal device may obtain the configurations of intra-frequency measurement gap from the received RRC signaling or system information.

In some embodiments, the terminal device may receive, from the at least one network device and in a Media Access Control (MAC) control element or a physical signaling, a triggering indication for the intra-frequency measurement. Upon the reception of the triggering indication, the terminal device may select the first and second sets of RX RF chains.

In some embodiments, the configurations of the intra-frequency measurement gap may include indications for at least one of: a starting time point of the intra-frequency measurement gap, a time duration of the intra-frequency measurement gap, a cycle of the intra-frequency measurement gap, and the number of occurrences of the intra-frequency measurement gap within a time period.

In some embodiments, the terminal device may determine a starting time point of the intra-frequency measurement gap and send, to the at least one network device and in a time period prior to the starting time point, a report of first channel state information (CSI). The first CSI is determined based on information received in the time period with the second set of RX RF chains. The terminal device may also send, to the at least one network device and within the intra-frequency measurement gap, a report of second CSI which is determined based on the information received during the intra-frequency measurement gap.

In some embodiments, the terminal device may send, to the at least one network device and in the time period, a report of third CSI which is determined based on information received in the time period with all of the plurality of RX RF chains.

In a second aspect, a method implemented at a network device is provided. The method comprises: determining whether a terminal device including a receiver equipped with a plurality of RX RF chains is to use a first set of RX RF chains from the plurality of RX RF chains for an intra-frequency measurement and a second set of RX RF chains from the plurality of RX RF chains for information reception during an intra-frequency measurement gap; and in response to determining that the terminal device is to use the first set of RX RF chain for the intra-frequency measurement and the second set of RX RF chains for the information reception, transmitting information to the terminal device during the intra-frequency measurement gap.

In a third aspect, there is provided a device implemented at a terminal device. The device comprises a processor and a memory. The memory contains instructions executable by the processor, whereby the device is operative to perform the method according to the first aspect.

In a fourth aspect, there is provided a device implemented at a network device. The device comprises a processor and a memory. The memory contains instructions executable by the processor, whereby the device is operative to perform the method according to the second aspect.

In a fifth aspect, there is provided a computer program product that is tangibly stored on a computer readable storage medium. The computer program product includes instructions which, when executed on at least one processor, cause the at least one processor to carry out the method according to the first or second aspect.

Through the following description, it would be appreciated that according to embodiments of the present disclosure, if a terminal device includes a receiver equipped with a plurality of RX RF chains, the terminal device uses two sets of RX RF chains from the plurality of RX RF chains for the intra-frequency measurement and the information reception, respectively. In this way, efficiencies of communications/services may be improved, and further user experiences may be improved.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
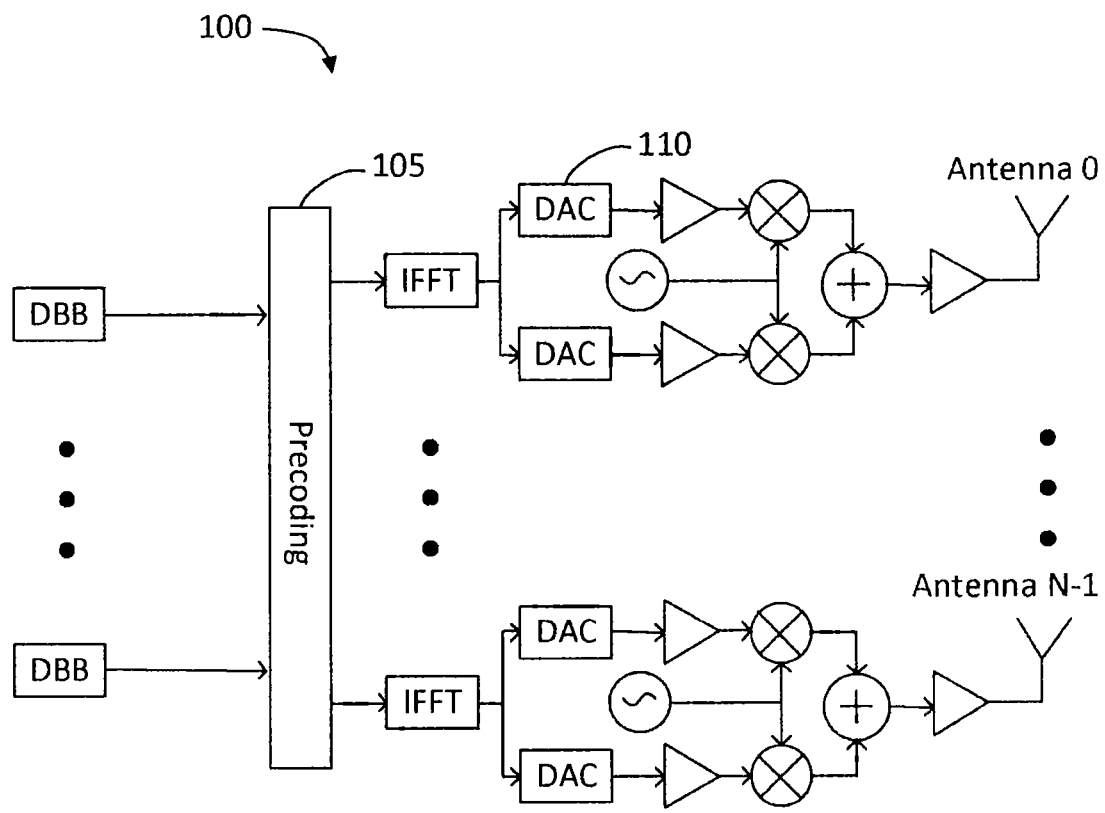
FIG. 1 shows example digital beamforming at a transmitter.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to a device capable of, configured for, arranged for, and/or operable for communications with a network device or a further terminal device in a wireless communication network. The communications may involve transmitting and/or receiving wireless signals using electromagnetic signals, radio waves, infrared signals, and/or other types of signals suitable for conveying information through air. In particular embodiments, the terminal device may be configured to transmit and/or receive information without direct human interaction. For instance, the terminal device may be designed to transmit information to a network side on predetermined schedules, when triggered by an internal or external event, or in response to requests from the network side.

The terminal device may refer to the endpoint of a wireless connection. Accordingly, the terminal device may be referred to as a wireless terminal. Furthermore, the terminal device may be mobile and, accordingly, referred to as a mobile device or a mobile terminal. Examples of the terminal device include, but are not limited to, user equipment (UE) such as smart phones. Further examples of the terminal device include wireless-enabled tablet computers, laptop-embedded equipment (LEE), laptop-mounted equipment (LME), and/or wireless customer-premises equipment (CPE).

As one specific example, the terminal device may be configured for communication in accordance with one or more communication technologies and corresponding communication standards promulgated by the 3GPP, the Internet Engineering Task Force (IETF), or other standardization organizations, such as Global System for Mobile (GSM), Universal Mobile Telecommunications System (UMTS), Code Division Multiple Access (CDMA), Wideband Code Division Multiple Access (WCDMA), High-Speed Packet Access (HSPA), Long Term Evolution (LTE), LTE-Advanced (LTE-A), Orthogonal Frequency Division Multiplexing (OFDM), the fifth generation (5G) standards, wireless local area network (WLAN), Worldwide Interoperability for Microwave Access (WiMAX), Bluetooth, ZigBee, and/or any other technologies either currently known or to be developed in the future.

As used herein, the term "user equipment" or "UE" may not necessarily have a "user" in the sense of a human user who owns and/or operates the relevant device. Instead, the UE refers to a device that is intended for sale to, or operation by, a human user but that may not initially be associated with a specific human user. For the purpose of discussion, in the following, some embodiments will be described with reference to UEs as examples of the terminal devices, and the terms "terminal device" and "user equipment" (UE) may be used interchangeably in the context of the present disclosure.

As used herein, the term "network device" refers to a transmission/reception device in a wireless communication network, which provides a coverage area and via which a terminal device within the coverage area may access the network and/or services. Examples of the network device include, but are not limited to, a base station (BS), a relay, an access point (AP), Multi-cell/Multicast Coordination Entity (MCE), a gateway, a server, a controller or any other suitable device in the wireless communication network. The BS may include, for example, a node B (NodeB or NB), an evolved NodeB (eNodeB or eNB), a Remote Radio Unit (RRU), a radio header (RH), a remote radio head (RRH), a low power node such as a femto, a pico, and the like. For the purpose of discussion, in the following, some embodiments will be described with reference to an eNB as an example of the network device.

Further examples of the network device include multistandard radio (MSR) radio equipment such as MSR BSs, network controllers such as radio network controllers (RNCs) or base station controllers (BSCs), base transceiver stations (BTSs), transmission points, transmission nodes, transmit-receive points (TRPs), Multi-cell/multicast Coordination Entities (MCEs), core network nodes, such as Mobile Switching Centers (MSCs) and MMES, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs). More generally, the network device refers to any suitable device (or group of devices) capable of, configured for, arranged for, and/or operable for enabling and/or allowing the access of the terminal device to the wireless communication network or providing some services to the terminal device that has accessed the wireless communication network.

In some scenarios of the present disclosure, the network devices may include a serving network device and a candidate network device for a terminal device. The serving network device refers to a network device which is serving the terminal device. The candidate network device refers to a network device which is not currently serving the terminal device but is a neighbor of the serving network device and may be a handover target of the terminal device as the terminal device moves.

In some scenarios of the present disclosure, a plurality of serving network devices of a terminal device may include a primary network device and at least one secondary network device. In the context of the present disclosure, the primary network device refers to a master or main network device that mainly controls the terminal device. The secondary network device refers to a slave network device that assists the primary network device in serving the terminal device.

As used herein, the term "serving beam" refers to a beam from a serving network device in which a terminal device accesses the network and/or services.

As used herein, the term "candidate beam" refers to a beam having a beam lobe shape different from that of the serving beam. The beam lobe shape may involve a direction of the beam, a width of the beam, and the like. When the UE is moving, the UE may perform measurements for candidate beams, for example, to find a target beam which has a better signal strength, or better time or space aligning.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

As described above, the digital and analog beamforming have been proposed to be arranged in a transmitter/receiver having an antenna array. FIG. 1 illustrates example digital beamforming at a transmitter 100. As shown, precoding is performed at block 105 in the digital domain before digit to analog conversion (DAC) at block 110.

Figure 2:
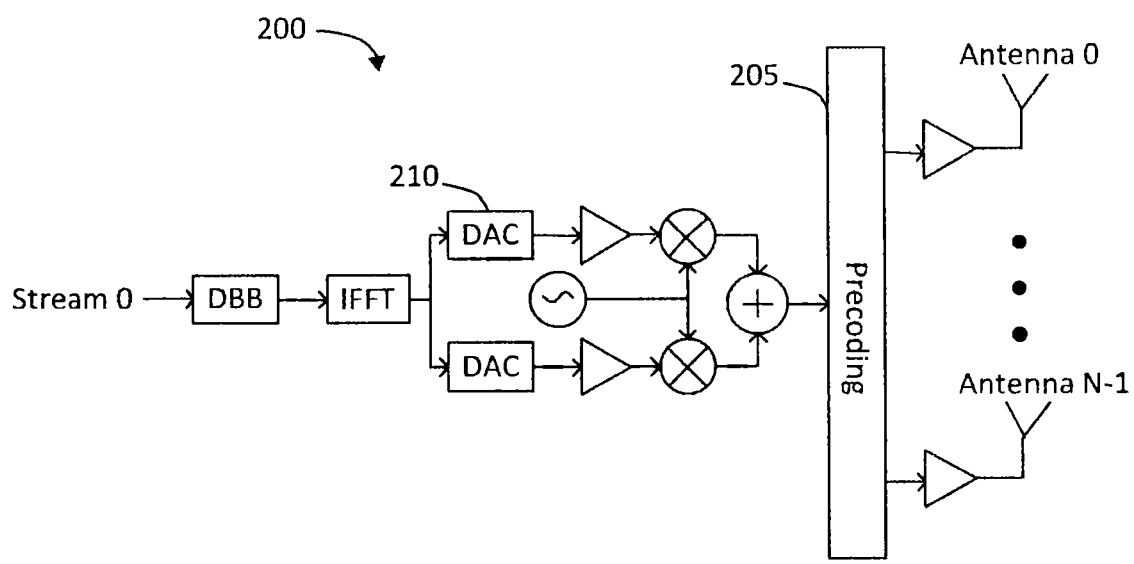
FIG. 2 shows example analog beamforming at a transmitter.

FIG. 2 illustrates example analog beamforming at a transmitter 200. As shown, precoding is applied at block 205 after DAC at block 210, for example, using phase shifters. The transmitter 200 includes only one TX RF chain, and only a single TX/RX beam may be generated, accordingly. Similarly, if only one RX RF chain is arranged at a receiver, the receiver may form a narrow RX beam. As a result, it may be difficult to receive data from more than one network device.

In addition, one RF chain typically corresponds to one antenna port and further to one transmission layer. Accordingly, the arrangement of only one RF chain renders that only single transmission layer is applied.

In order to improve communication efficiencies of the analog beamforming, the hybrid beamforming antenna equipped with more than one TX/RX RF chains has been proposed. In a transmitter with such an antenna structure, multiple TX RF chains as shown in FIG. 2 may be arranged, for example. In the receiver side, the structure is similar except that the signal flow is in the reverse direction and there is an Analog to Digit Converter (ADC) instead of DAC.

In addition, the inter-frequency and intra-frequency measurements have been proposed to enable the mobility of the UEs, as described above. For example, in a Long Term Evolution (LTE), a measurement gap has been used for the inter-frequency measurement, which may include measurements of cell identifications and signal strengths for a candidate frequency or carrier. The inter-frequency measurement may be performed within a periodic measurement gap. During this gap, the UE has to stop all the ongoing activities in the original frequency and switch to a target frequency for measurement.

Figure 3:
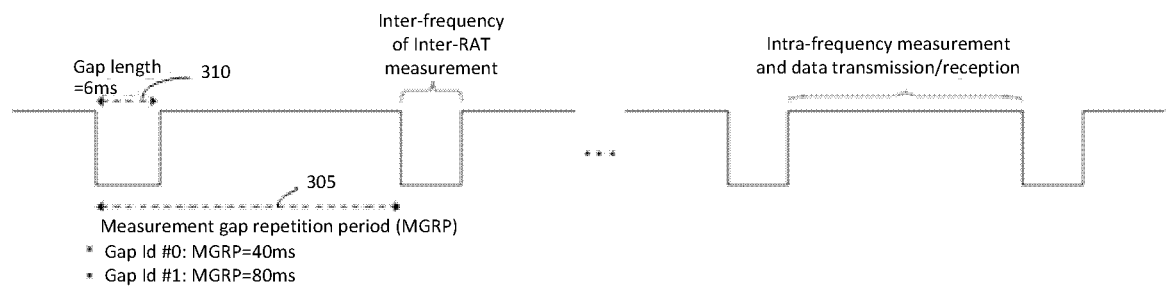
FIG. 3 shows two example gap patterns configured for the inter-frequency measurement.

FIG. 3 illustrates two example gap patterns configured for the inter-frequency measurement. The two gap patterns include a gap pattern with an identification (Id) #0 (noted as "Gap Id #0") and a gap pattern with an Id #1 (noted as "Gap Id #1"). As shown, for Gap Id #0", a measurement gap repetition period (MGRP) 305 is 40 ms. That is, in this pattern, the inter-frequency measurement gap occurs every 40 ms. For Gap Id #1, the MGRP is 80 ms, that is, the inter-frequency measurement gap occurs every 80 ms. For these two patterns, a gap length 310 of 6 ms may be used within one MGRP of 40 or 80 ms. During the gap of 6 ms, the UE has to stop data transmission/reception, which may result in a severe service interruption, as described above.

In this example, as shown, the intra-frequency measurement as well as the data transmission/reception may be performed outside the inter-frequency measurement gap. As proposed, the intra-frequency measurement is prioritized by the UE over the inter-frequency measurement. Accordingly, the intra-frequency measurement is supposed to have a higher occurrence probability than the inter-frequency measurement. For the UE equipped with the hybrid beamforming antenna, it is a severe waste of processing resources to use all RX RF chains, in particular, for the intra-frequency measurement.

In order to at least in part solve the above and other potential problems, embodiments of the present disclosure allow a terminal device, which includes a receiver equipped with a plurality of RX RF chains, to use two sets of RX RF chains (referred to as "a first set of RX RF chains" and "a second set of RX RF chains", respectively) from the plurality of RX RF chains, respectively, for an intra-frequency measurement and for information reception during an intra-frequency measurement gap. According to embodiments of the present disclosure, when the terminal device is served by at least one network device, the terminal device first selects the first and second sets of RX RF chains from the plurality of RX RF chains. Then, during the intra-frequency measurement gap, the terminal device uses the first set of RX RF chains to perform the intra-frequency measurement for a candidate beam having a beam lobe shape different from that of a serving beam from the network device. At the same time, the terminal device uses the second set of RX RF chains to receive information in the serving beam from the network device.

In this way, for the terminal device equipped with the hybrid beamforming antenna, only some RX RF chains at the receiver are configured to perform the intra-frequency measurement, while the other RX RF chains are still used for the information reception in the serving beams. That is, the information reception may be maintained during the intra-frequency measurement. As a result, efficiencies of communications/services may be improved, and further user experiences may be improved.

Figure 4:
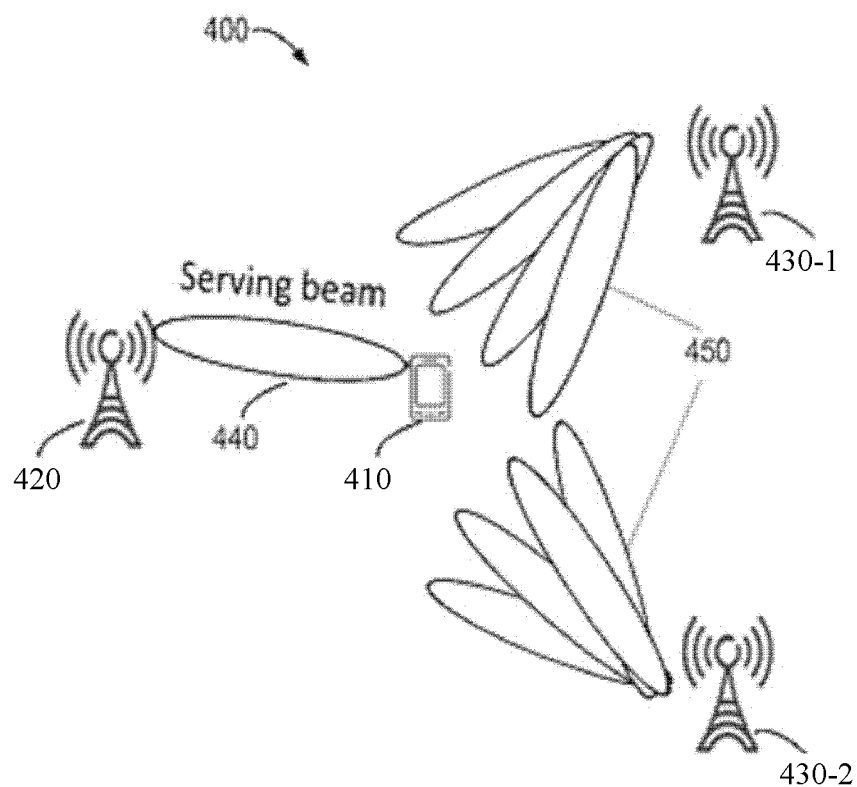
FIG. 4 shows an example wireless communication network in which embodiments of the present disclosure can be implemented.

FIG. 4 shows an example wireless communication network 400 in which embodiments of the present disclosure can be implemented. The network 400 includes a terminal device 410. The terminal device 410 has one serving network device 420 and two candidate network devices 430-1 and 430-2 (referred to as "candidate network device 430" below). The terminal device 410 may communicate with the serving network device 420 and the candidate network devices 430. The communications may conform to any suitable standard and using any suitable communication technologies such as LTE, LTE-A, OFDM, HSPA, WCDMA, CDMA, GSM, WLAN, WiMAX, Bluetooth, Zigbee, and/or any other technologies either currently known or to be developed in the future.

It is to be understood that the number of terminal devices and serving and candidate network devices thereof in the network 400 is only for the purpose of illustration without suggesting any limitation. The network 400 may include any suitable number of terminal devices adapted for implementing embodiments of the present disclosure. Each terminal device may have any suitable number of service network devices and candidate network devices depending on service deployments.

As shown, the terminal device 410 is served by the serving network device 420. The terminal device 410 includes a receiver equipped with a plurality of RX RF chains. These RX RF chains may be used by the terminal device 410 to receive information in a serving beam 440 from the serving network device 420. According to embodiments of the present disclosure, during the intra-frequency measurement gap, the terminal device 410 only uses some of the RX RF chains to perform the intra-frequency measurement for a candidate beam 450. The terminal device 410 simultaneously continues to receive the information in the serving beam 440 using some others of the RX RF chains.

In this way, for a terminal device with a plurality of RX RF chains, during the intra-frequency measurement gap, both the intra-frequency measurement and the information reception are enabled with these RX RF chains. Compared with the conventional approach of using all the RX RF chains for the intra-frequency measurement, a reservation of some RX RF chains for the information reception is more effective and efficient, and thereby the user experiences may be improved.

Figure 5:
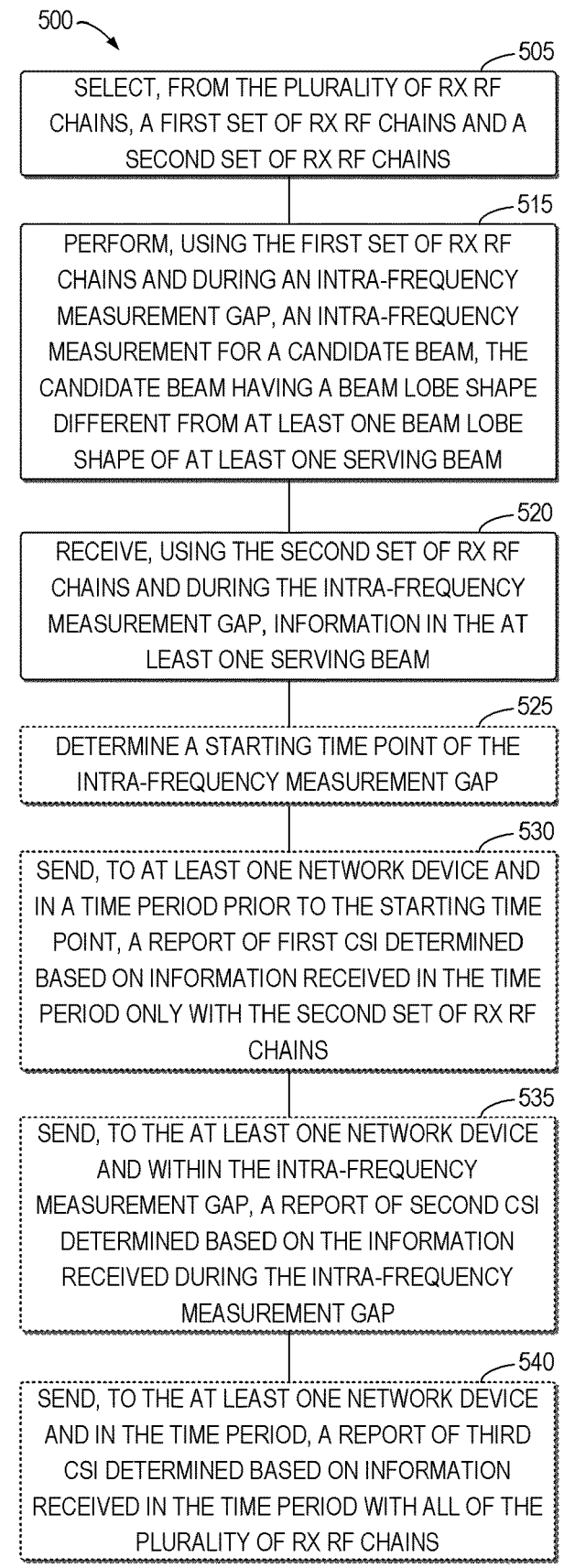
FIG. 5 shows a flowchart of an example method in accordance with some embodiments of the present disclosure.

FIG. 5 shows a flowchart of an example method 500 in accordance with some embodiments of the present disclosure. The method 500 can be implemented at the terminal device 410 as shown in FIG. 4. For the purpose of discussion, the method 500 will be described with reference to FIG. 4.

At block 505, the terminal device 410 selects a first set of RX RF chains and a second set of RX RF chains from the plurality of RX RF chains. According to embodiments of the present disclosure, the first set of RX RF chains is to be used by the terminal device 410 for an intra-frequency measurement during an intra-frequency measurement gap, and the second set of RX RF chains is to be used by the terminal device 410 for information reception during the intra-frequency measurement gap.

The selection may be implemented in any suitable way. In some embodiments, a selection rule for the first set of RX RF chains may be employed. For example, the terminal device 410 may use the selection rule to select the first set of RX RF chains. The selection rule may be predefined in the network 400. In this case, devices at both terminal and network sides may be aware of the rule.

Alternatively or in addition, the selection rule may be received by the terminal device 410 from a network device, such as the serving network device 420. For example, the terminal device 410 may receive a configuration of the selection rule from the network device 420. The informing of the selection rule from the network device to the terminal device allows a dynamic update of the configuration.

The configuration of the selection rule may be received in any suitable message or signaling. As an example, the configuration may be carried (or, embedded or included) in a Radio Resource Control (RRC) signaling to further improve transmission reliability. Other messages may also be used to carry the configuration, which, for example, include system information, a Media Access Control (MAC) control element (CE), a physical signaling, and the like.

The selection rule may take any suitable factor into account. In some embodiments, the selection rule may be related to qualities of signals received by the terminal device 410 using the plurality of RX RF chains. For example, the RX RF chain with the worst quality of the received signal may be selected to be used for the intra-frequency measurement. In this example, the terminal device 410 may measure the quality of the received signal in the individual RX RF chains and then select the RX RF chain with the worst quality. The quality of the signal may be represented by received signal strength. Other representations may be possible. In this way, the terminal device may reserve the RX RF chains with a better signal quality (for example, larger received signal strength) for the information reception during the intra-frequency measurement gap so as to further improve the efficiencies of the communications.

As another example, the selection rule may be related to indexes associated with the plurality of RX RF chains. For example, the terminal device 410 may select the RX RF chain with a smallest or largest index of the intra-frequency measurement according to pre-configurations or pre-definitions. Any suitable indexing approach may be used for the RX RF chains which is currently known or will be developed in the future. As an example, an antenna port number may be used as an index of a RX RF chain which is assigned to the antenna port having the number.

In addition to the configuration of the selection rule, configurations related to the intra-frequency measurement gap may be received by the terminal device 410. Examples of the configurations include, but are not limited to, a starting time point of the intra-frequency measurement gap, a time duration of the intra-frequency measurement gap, a cycle of the intra-frequency measurement gap, and/or the number of occurrences of the intra-frequency measurement gap within a time period. The configurations of the intra-frequency measurement gap may be implemented in any suitable message and at any suitable timing. For example, the configurations may be received in system information, a RRC signaling, a MAC CE, a physical signaling and the like.

In addition to the selection rule for the first set of RX RF chains, any other factors may be considered in selecting the two sets of RX RF chains. In the embodiments where the terminal device 410 is served by more than one network device, each of the network devices may have a connection to the terminal device 410. In this case, the selection of the two sets of RX RF chains may consider a plurality of connections from these network devices. For example, the terminal device 410 may select at least one connection from the plurality of connections and then select the first set of RX RF chains from the RX RF chains associated with the selected connection.

The connection may be selected based on any suitable rule. In some embodiments, the terminal device 410 may select the connection from the network device which triggers the intra-frequency measurement. For example, if the terminal device 410 is served by a plurality of network devices, the intra-frequency measurement gap may be configured for at least one of the connections from these network devices.

If the intra-frequency measurement is triggered by one of the network devices (for example, the serving network device 420), the connection from the network device may be selected no matter whether this network device is a primary or secondary network device. The triggering may be implemented in any suitable signaling. In the embodiments where the RRC signaling is used for carrying the configurations, a MAC CE or a physical signaling may be used for the triggering. Embodiments in this regard will be discussed in the following paragraphs. In this way, other connections may still serve the terminal device without a degradation/interruption of a receiver gain.

In some other embodiments, the terminal device 410 may select a connection from a secondary network device from the plurality of serving network devices, no matter whether the intra-frequency measurement gap is triggered for the secondary connection or not. In this way, a primary connection from the primary network device may be reserved so as to further improve the receiver gain.

The selection of the first and second sets of RX RF chains may be performed by the terminal device 410 in any suitable timing before a starting time point of the intra-frequency measurement gap. As described above, in some embodiments, the terminal device 410 may obtain the configurations of the intra-frequency measurement gap in the RRC signaling and be triggered to perform the intra-frequency measurement with the MAC CE or physical signaling. For example, the terminal device 410 may receive a triggering indication for the intra-frequency measurement from a network device, such as the serving network device 420 in the MAC CE or physical signaling. Upon the reception of the triggering indication, the terminal device 410 may perform the selection of the two sets of RX RF chains.

The triggering indication may be received by the terminal device 410 in any suitable timing. By way of example, the terminal device may be served by an eNB hosting multiple Transmit-Receive Points (TRPs). In this scenario, coverage areas of the TRPs form a cell of the eNB. The terminal device may receive multiple beams from the TRPs, and at least one of the beams may act the serving beam of the terminal device. When the terminal device moves within the cell of the eNB, if the radio quality of a current serving beam from one of the TRPs becomes worse than a threshold, the TRP may send to the terminal device a triggering indication for the intra-frequency measurement. Accordingly, the terminal device 410 may receive the triggering indication and then perform the measurement to find a good enough beam for beam switch.

Still reference to FIG. 5, after the first and second sets of RX RF chains are selected at block 505, the terminal device 410 uses, at block 515, the first set of RX RF chains to perform the intra-frequency measurement for a candidate beam during the intra-frequency measurement gap. The candidate beam has a direction/width different from that of any one of the serving beams, such as the serving beam 440 from the serving network device 410. Any suitable approach currently existing or to be developed in the future may be used in the intra-frequency measurement. At block 520, the terminal device 410 uses the second set of RX RF chains to receive information in the at least one serving beam during the intra-frequency measurement gap.

Figure 6:
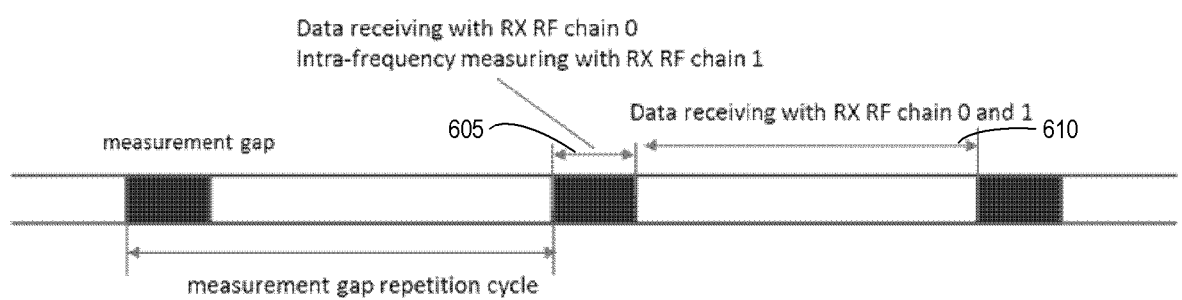
FIG. 6 shows an example configuration of the RX RF chains for both the intra-frequency measurement and the information reception in accordance with some embodiments of the present disclosure.

An example configuration of the RX RF chains for both the intra-frequency measurement and the information reception is shown in FIG. 6. In this example, as shown, two RX RF chains (for example, RX RF chain 1 and RX RF chain 0) have been arranged in the terminal device 410. During an intra-frequency measurement gap 605, the terminal device 410 uses the RX RF chain 1 for the intra-frequency measurement and the RX RF chain 0 for the continuous data reception. In a time period 610 outside the gap, the terminal device 410 may use both the RX RF chains for the data reception. In this way, Since the terminal device 410 may use the second set of RX RF chains to continue receiving the information in the serving beam during the intra-frequency measurement, in some embodiments, the terminal device 410 may measure or estimate channel qualities for these RF chains. In this case, as shown, at block 525, the terminal device 410 may determine a starting time point of the intra-frequency measurement gap. Then, at block 530, the terminal device sends a report of channel state information (CSI) (referred to as "first CSI") with only the second set of receiving RF chains for information receiving to a network device (for example, the serving network device 420) in a time period prior to the starting time point. Further, at block 535, within the intra-frequency measurement gap, the terminal device 410 may send a report of CSI (referred to as "second CSI") for the second set of RX RF chains to the network device. In this way, the network device may be aware of a change of the channel quality for the second set of RX RF chains and further make corresponding scheduling. Embodiments in this regard will be described in the following paragraphs with reference to FIG. 7.

In addition, in the time period prior to the starting time point of the intra-frequency measurement gap, the terminal device 410 may send, at block 540, a further report of CSI (referred to as "third CSI") with all of the plurality of RX RF chains for information receiving to the network device since all of the RF chains may be used for information reception outside the gap. While within the gap, the terminal device may only report the CSI for the less RX RF chains for the information reception.

Figure 7:
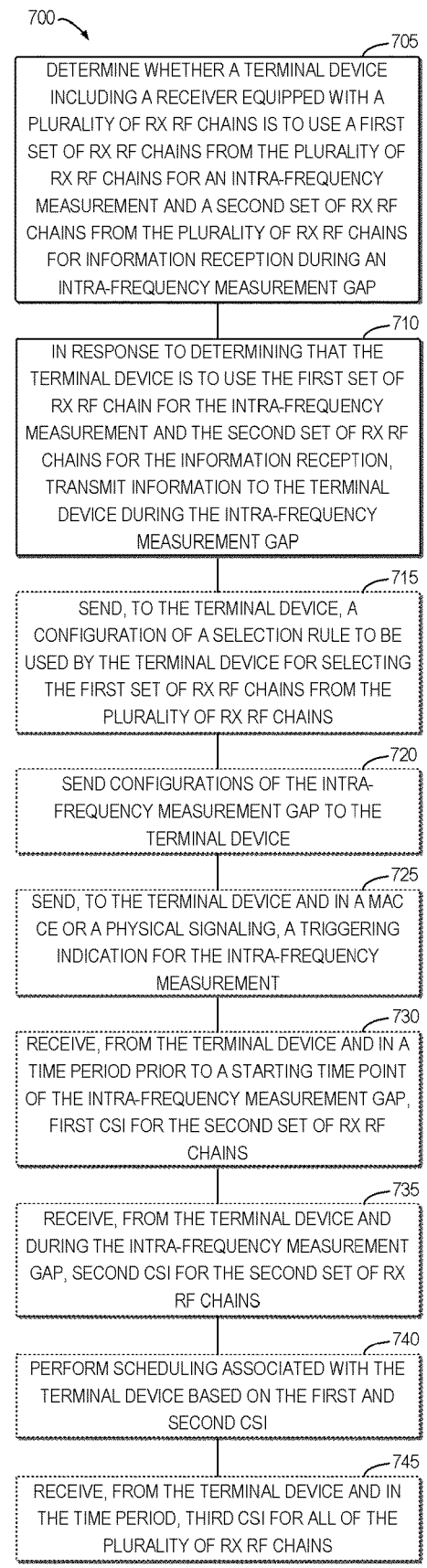
FIG. 7 shows a flowchart of an example method in accordance with some other embodiments of the present disclosure.

FIG. 7 shows a flowchart of an example method 700 in accordance with some other embodiments of the present disclosure. The method 700 can be implemented at the network device 420 or 430 as shown in FIG. 4. For the purpose of discussion, the method 700 will be described from the prospective of the network device 420 with reference to FIG. 4.

At block 705, the network device 420 determines whether a terminal device (for example, the terminal device 410) is to use a first set of RX RF chains from the plurality of RX RF chains for an intra-frequency measurement and a second set of RX RF chains from the plurality of RX RF chains for information reception during an intra-frequency measurement gap. The terminal device includes a receiver equipped with the plurality of RX RF chains. At block 710, if it is determined that the terminal device is to use the first set of RX RF chain for the intra-frequency measurement and the second set of RX RF chains for the information reception, the network device 420 transmits information to the terminal device, for example, via the serving beam 440, during the intra-frequency measurement gap.

In some embodiments, at block 715, the network device 420 may send a configuration of a selection rule to the terminal device such that the terminal device may use the selection rule for selecting the first set of receiving RF chains from the plurality of receiving RF chains. As described above, the configuration of the selection rule may be sent in any suitable message or signaling, such as the system information, the RRC signaling, the MAC CE, or the physical signaling.

As described above, the selection rule may consider any suitable factors, which may include, for example, the qualities of signals received by the terminal device using the plurality of RX RF chains, and/or the indexes associated with the plurality of RX RF chains.

In some embodiments, the network device 420 may receive the first CSI for the second set of RX RF chains in a time period prior to a starting time point of the intra-frequency measurement gap (for example, at block 730) and receive the second CSI for the second set of RX RF chains from the terminal device and during the intra-frequency measurement gap (for example, at block 735).

Further, the network device 420 may perform scheduling on the terminal device based on the first and second CSI at block 740. The scheduling may include user selections and/or adaptions of antenna ranks and modulation and coding schemes (MCSs) with respect to the terminal device. In this way, scheduling priorities of served terminal devices and link adaptations within the intra-frequency measurement gap may still be determined, for example, based on the CSI for some of the RX RF chains.

In some embodiments, the network device 420 may also receive the third CSI for all of the plurality of RF chains from the terminal device and in the time period at block 745. Accordingly, outside the intra-frequency measurement gap, the network device 420 may determine the scheduling associated with the terminal device based on the CSI for all the RX RF chains.

In some embodiments, in block 720, the network device 420 may send configurations of the intra-frequency measurement gap to the terminal device in any suitable message, such as the system information, the RRC signaling, the MAC CE, or the physical signaling. In the embodiments where the configurations of the intra-frequency measurement gap are sent in the RRC signaling, in block 725, the network device 420 may send a triggering indication for the intra-frequency measurement to the terminal device in the MAC CE or the physical signaling. The configurations of the intra-frequency measurement gap may include any suitable configuration related to the intra-frequency measurement gap. For example, the configurations may include indications for at least one of: a starting time point of the intra-frequency measurement gap, a time duration of the intra-frequency measurement gap, a cycle of the intra-frequency measurement gap, and the number of occurrences of the intra-frequency measurement gap in a time period.

It is to be understood that all operations and features related to the network node described above with reference to FIGS. 5 and 6 are likewise applicable to the method 700 and have similar effects. For the purpose of simplification, the details will be omitted.

Figure 8:
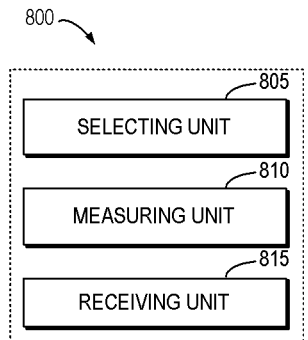
FIG. 8 shows a block diagram of an apparatus in accordance with some embodiments of the present disclosure.

FIG. 8 shows a block diagram of an apparatus 800 in accordance with some embodiments of the present disclosure. The apparatus 800 can be considered as an example implementation of the terminal device 410 as shown in FIG. 4.

As shown, the apparatus 800 comprises: a selecting unit 805 configured to select, from the plurality of receiving RF chains, a first set of receiving RF chains and a second set of receiving RF chains; a measuring unit 810 configured to perform, using the first set of receiving RF chains and during an intra-frequency measurement gap, an intra-frequency measurement for a candidate beam, the candidate beam having a beam lobe shape different from at least one beam lobe shape of at least one serving beam from at least one network device (for example, the network device 420); and a receiving unit 815 configured to receive, using the second set of receiving RF chains and during the intra-frequency measurement gap, information in the at least one serving beam.

Figure 9:
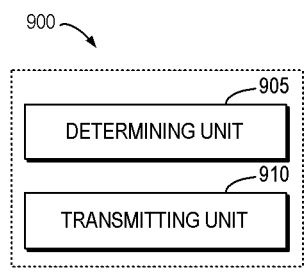
FIG. 9 shows a block diagram of an apparatus in accordance with some other embodiments of the present disclosure.

FIG. 9 shows a block diagram of an apparatus 900 in accordance with some other embodiments of the present disclosure. The apparatus 900 can be considered as an example implementation of the network device 420 or 430 as shown in FIG. 4.

As shown, the apparatus 900 comprises: a determining unit 905 configured to determine whether a terminal device (for example, the terminal device 410) including a receiver equipped with a plurality of receiving radio frequency, RF, chains is to use a first set of receiving RF chains from the plurality of receiving RF chains for an intra-frequency measurement and a second set of receiving RF chains from the plurality of receiving RF chains for information reception during an intra-frequency measurement gap; and a transmitting unit 910 configured to, in response to determining that the terminal device is to use the first set of receiving RF chain for the intra-frequency measurement and the second set of receiving RF chains for the information reception, transmit information to the terminal device during the intra-frequency measurement gap.

It should be appreciated that units included in the apparatuses 800 and 900 correspond to the blocks of the methods 500 and 700, respectively. Therefore, all operations and features described above with reference to FIGS. 4 to 7 are likewise applicable to the units included in the apparatuses 800 and 900 and have similar effects. For the purpose of simplification, the details will be omitted.

The units included in the apparatuses 800 and 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the terminal device 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
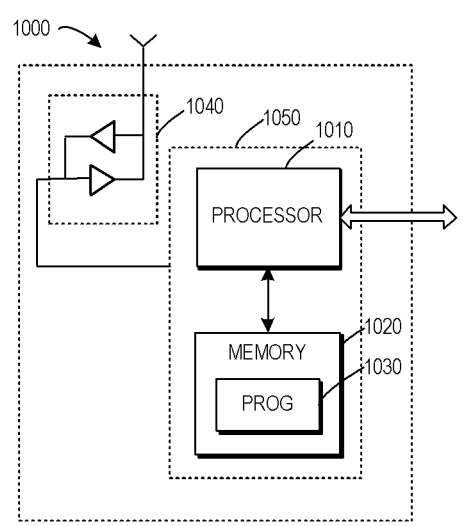
FIG. 10 shows a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the terminal device 410 or the network device 420 or 430 as shown in FIG. 4. Accordingly, the device 1000 can be implemented at or as at least a part of the terminal device 410 or the network device 420 or 430.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has multiple antennas to facilitate communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 1030 is assumed to include program instructions that, when executed by the associated processor 1010, enable the device 1000 to operate in accordance with the embodiments of the present disclosure, as discussed herein with reference to FIGS. 4 to 7. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1010 may form processing means 1050 adapted to implement various embodiments of the present disclosure.

The memory 1010 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1010 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 700 as described above with reference to FIGS. 4-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, the terminal device being served by at least one network device and including a receiver equipped with a plurality of receiving radio frequency (RF) chains, the method comprising:
    selecting, from the plurality of receiving RF chains, a first set of receiving RF chains and a second set of receiving RF chains;
    performing, using the first set of receiving RF chains and during an intra-frequency measurement gap, an intra-frequency measurement for a candidate beam, the candidate beam having a beam lobe shape different from at least one beam lobe shape of at least one serving beam from the at least one network device;
    receiving, using the second set of receiving RF chains and during the intra-frequency measurement gap, information in the at least one serving beam; and
    sending to the at least one network device, channel state information (CSI) for the plurality of receiving RF chains during the intra-frequency measurement gap and in a time period prior to a starting time point of the intra-frequency measurement gap, the sending comprising:
        determining the starting time point of the intra-frequency measurement gap;
        sending, to the at least one network device and in the time period prior to the starting time point, a report of a first CSI, the first CSI being determined based on information received in the time period with the second set of receiving RF chains;
        sending, to the at least one network device and within the intra-frequency measurement gap, a report of a second CSI, the second CSI being determined based on the information received during the intra-frequency measurement gap; and
        sending, to the at least one network device in the time period, a report of a third CSI, the third CSI being determined based on information received in the time period with all of the plurality of receiving RF chains.

2. The method of claim 1, wherein selecting the first and second sets of receiving RF chains comprises:
    determining a selection rule for the first set of receiving RF chains; and
    selecting the first set of receiving RF chains from the plurality of receiving RF chains based on the selection rule.

3. The method of claim 2, wherein determining the selection rule comprises:
    receiving a configuration of the selection rule from the at least one network device, wherein the configuration is received in a Radio Resource Control (RRC) signaling.

4. The method of claim 2, wherein the selection rule is related to at least one of:
    qualities of signals received using the plurality of receiving RF chains, and
    indexes associated with the plurality of receiving RF chains.

5. The method of claim 1, wherein the at least one network device includes a plurality of network devices, and the plurality of receiving RF chains are associated with a plurality of connections from the plurality of network devices, and selecting the first and second sets of receiving RF chains comprises:
    selecting at least one connection from the plurality of connections;
    determining, from the plurality of receiving RF chains, receiving RF chains associated with the at least one selected connection; and
    selecting the first set of receiving RF chains from the determined receiving RF chains.

6. The method of claim 1, further comprising:
    receiving configurations of the intra-frequency measurement gap from the at least one network device.

7. The method of claim 6, wherein receiving the configurations of the intra-frequency measurement gap comprises:
    receiving a Radio Resource Control (RRC) signaling, or system information from the at least one network device; and obtaining the configurations of the intra-frequency measurement gap from the received RRC signaling or system information.

8. The method of claim 7, wherein selecting the first and second sets of RF chains comprises:
receiving, from the at least one network device and in a Media Access Control (MAC) control element or a physical signaling, a triggering indication for the intra-frequency measurement; and
in response to the reception of the triggering indication, selecting the first and second sets of receiving RF chains.

9. The method of claim 6, wherein the configurations of the intra-frequency measurement gap include indications for at least one of:
the starting time point of the intra-frequency measurement gap,
a time duration of the intra-frequency measurement gap,
a cycle of the intra-frequency measurement gap, and
the number of occurrences of the intra-frequency measurement gap within a time period.

10. A method implemented at a network device, comprising:
determining whether a terminal device including a receiver equipped with a plurality of receiving radio frequency (RF) chains is to use a first set of receiving RF chains from the plurality of receiving RF chains for an intra-frequency measurement and a second set of receiving RF chains from the plurality of receiving RF chains for information reception during an intra-frequency measurement gap;
in response to determining that the terminal device is to use the first set of receiving RF chain for the intra-frequency measurement and the second set of receiving RF chains for the information reception, transmitting information to the terminal device during the intra-frequency measurement gap; and
receiving, from the terminal device, channel state information (CSI) for the plurality of receiving RF chains of the terminal device during the intra-frequency measurement gap and in a time period prior to a starting time point of the intra- frequency measurement gap, the receiving comprising:
receiving, from the terminal device and in the time period prior to the starting time point of the intra-frequency measurement gap, a first CSI, the first CSI being determined by the terminal device based on information received in the time period with the second set of receiving RF chains;
receiving, from the terminal device and during the intra-frequency measurement gap, a second CSI, the second CSI being determined by the terminal device based on the information received during the intra-frequency measurement gap;
performing scheduling associated with the terminal device based on the first and second CSI; and
receiving, from the terminal device and in the time period, a third CSI, the third CSI being determined by the terminal device based on the information received in the time period with all of the plurality of receiving RF chains.

11. The method of claim 10, further comprising:
sending, to the terminal device, a configuration of a selection rule to be used by the terminal device for selecting the first set of receiving RF chains from the plurality of receiving RF chains.

12. The method of claim 11, wherein sending the configuration of the selection rule comprises:
sending, to the terminal device, a Radio Resource Control (RRC) signaling including the configuration of the selection rule.

13. The method of claim 11, wherein the selection rule is related to at least one of:
qualities of signals received by the terminal device using the plurality of receiving RF chains, and
indexes associated with the plurality of receiving RF chains.

14. The method of claim 10, further comprising:
sending configurations of the intra-frequency measurement gap to the terminal device.

15. The method of claim 14, wherein sending the configurations of the intra-frequency measurement gap comprises:
sending, to the terminal device, a Radio Resource Control (RRC) signaling, or system information including the configurations of the intra-frequency measurement gap.

16. The method of claim 15, further comprising:
sending, to the terminal device and in a Media Access Control (MAC) control element or a physical signaling, a triggering indication for the intra-frequency measurement.

17. The method of claim 15, wherein the configurations of the intra-frequency measurement gap include indications for at least one of:
the starting time point of the intra-frequency measurement gap,
a time duration of the intra-frequency measurement gap,
a cycle of the intra-frequency measurement gap, and
the number of occurrences of the intra-frequency measurement gap within a time period.

18. A device implemented at a terminal device, comprising:
a processor and a non-transitory computer readable storage medium containing instructions, executable by the processor and causing the device to perform:
selecting, from a plurality of receiving radio frequency (RF) chains, a first set of receiving RF chains and a second set of receiving RF chains;
performing, using the first set of receiving RF chains and during an intra-frequency measurement gap, an intra-frequency measurement for a candidate beam, the candidate beam having a beam lobe shape different from at least one beam lobe shape of at least one serving beam from a network device serving the terminal device;
receiving, using the second set of receiving RF chains and during the intra-frequency measurement gap, information in the at least one serving beam; and
sending to the network device, channel state information (CSI) for the plurality of receiving RF chains during the intra-frequency measurement gap and in a time period prior to a starting time point of the intra-frequency measurement gap, the sending comprising:
determining the starting time point of the intra-frequency measurement gap;
sending, to the at least one network device and in the time period prior to the starting time point, a report of a first CSI, the first CSI being determined based on information received in the time period with the second set of receiving RF chains;
sending, to the at least one network device and within the intra-frequency measurement gap, a report of a second CSI, the second CSI being determined based on the information received during the intra-frequency measurement gap; and
sending, to the at least one network device in the time period, a report of a third CSI, the third CSI being determined based on information received in the time period with all of the plurality of receiving RF chains.

19. The device of claim 18, wherein selecting the first and second sets of receiving RF chains comprises:
determining a selection rule for the first set of receiving RF chains; and
selecting the first set of receiving RF chains from the plurality of receiving RF chains based on the selection rule.

20. The device of claim 19, wherein determining the selection rule comprises:
receiving a configuration of the selection rule from the network device, wherein the configuration is received in a Radio Resource Control (RRC) signaling.

21. A device implemented at a network device, comprising:
a processor and a non-transitory computer readable storage medium containing instructions, executable by the processor and causing the device to perform:
determining whether a terminal device including a receiver equipped with a plurality of receiving radio frequency (RF) chains is to use a first set of receiving RF chains from the plurality of receiving RF chains for an intra-frequency measurement and a second set of receiving RF chains from the plurality of receiving RF chains for information reception during an intra-frequency measurement gap;
in response to determining that the terminal device is to use the first set of receiving RF chain for the intra-frequency measurement and the second set of receiving RF chains for the information reception, transmitting information to the terminal device during the intra-frequency measurement gap; and
receiving, from the terminal device, channel state information (CSI) for the plurality of receiving RF chains of the terminal device during the intra-frequency measurement gap and in a time period prior to a starting time point of the intra-frequency measurement gap, the receiving comprising:
receiving, from the terminal device and in the time period prior to the starting time point of the intra-frequency measurement gap, a first CSI, the first CSI being determined by the terminal device based on information received in the time period with the second set of receiving RF chains;
receiving, from the terminal device and during the intra-frequency measurement gap, a second CSI, the second CSI being determined by the terminal device based on the information received during the intra-frequency measurement gap;
performing scheduling associated with the terminal device based on the first and second CSI; and
receiving, from the terminal device and in the time period, a third CSI, the third CSI being determined by the terminal device based on the information received in the time period with all of the plurality of receiving RF chains.

22. The device of claim 21, wherein the device further performs:
sending, to the terminal device, a configuration of a selection rule to be used by the terminal device for selecting the first set of receiving RF chains from the plurality of receiving RF chains.

23. The device of claim 22, wherein sending the configuration of the selection rule comprises:
sending, to the terminal device, a Radio Resource Control (RRC) signaling including the configuration of the selection rule.

* * * * *